United States Patent Office 2,749,363
Patented June 5, 1956

2,749,363
PURIFICATION OF AROMATIC ACIDS
George T. Williamson, Oakland, and Orris L. Davis, Berkeley, Calif., assignors to Shell Development Company, Emeryville, Calif., a corporation of Delaware
No Drawing. Application November 23, 1951,
Serial No. 257,968
6 Claims. (Cl. 260—525)

This invention relates to the purification of aromatic acids. The invention relates more particularly to the separation of aromatic acids in a high state of purity from reaction mixtures obtained by the catalytic oxidation of aromatic hydrocarbons. A particular aspect of the invention relates to the separation of benzoic acid and alkyl-substituted benzoic acids in a high state of purity from reaction mixtures containing said acids in admixture with residual catalyst obtained by the catalytic oxidation of aromatic hydrocarbons.

The aromatic acids obtained by the oxidation of hydrocarbons as generally available are often contaminated by the presence therein of impurities, the removal of which is essential before such compounds can be employed in many important fields of application. The presence of certain impurities is often an unavoidable consequence of operating conditions employed in the production of the aromatic acids. Thus, in the catalytic oxidation of aromatic hydrocarbons to aromatic acids catalysts are often employed which are removed completely only with great difficulty, if at all, from the final products. The nature and properties of impurities, such as, for example, residual catalysts and/or derivative products thereof, are generally such that they will seriously affect the suitability of an aromatic acid containing them for use in many fields of application even though present in relatively small amounts.

It is an object of the present invention to provide an improved process enabling the more efficient separation of an aromatic acid in a high state of purity from reaction mixtures obtained by the catalytic oxidation of hydrocarbons.

Another object of the invention is the provision of an improved process enabling the more efficient separation of monocarboxylic aromatic acids in a high state of purity from reaction mixtures obtained by the oxidation of an aromatic hydrocarbon comprising alkyl benzenes in the presence of a metallo-organic compound.

Still another object of the invention is the provision of an improved process enabling the more efficient separation of monocarboxylic aromatic acids in a high state of purity from a reaction mixture obtained by the oxidation of aromatic hydrocarbons comprising alkyl substituted benzenes in the presence of catalysts comprising a salt of a heavy metal and an organic acid.

A further object of the invention is the provision of an improved process enabling the more efficient separation of a monocarboxylic aromatic acid from mixtures comprising said aromatic acid in admixture with contaminating amounts of salts of a heavy metal and an organic acid.

A particular aspect of the invention is the provision of an improved process enabling the more efficient separation of a tert.-alkyl substituted benzoic acid in a high state of purity from reaction mixtures obtained by the oxidation of aromatic hydrocarbons comprising tert.-alkyl substituted toluene in the presence of a catalyst comprising a salt of a polyvalent metal and an organic acid. Other objects and advantages of the invention will become apparent from the following detailed description thereof.

In accordance with the present invention aromatic acids are obtained in a high state of purity, substantially free of metal-containing compounds, from mixtures comprising the aromatic acid in admixture with metal compound-containing impurities by extracting said mixtures in the liquid phase with water at a temperature which is sufficiently high to assure the presence of at least the greater part of said mixture in the liquid state during the extraction and at a hydrogen ion concentration below about 4 in terms of pH values.

Organic acids purified in accordance with the invention may be obtained from any suitable source. The invention is applied, however, with particular advantage to the separation of aromatic acids in a high state of purity from the reaction mixtures obtained by the catalytic oxidation of aromatic hydrocarbons having an alkyl substituted aromatic nucleus under conditions resulting in the oxidation of an alkyl substitutent attached to the aromatic nucleus. Aromatic hydrocarbons of this class are exemplified, for example, by the alkyl-substituted benzenes and alkyl-substituted naphthalenes such as toluene, the xylenes, ethyl benzene, propylbenzene, isopropylbenzene (cumene), tetramethylbenzene, paracymene, 1-methyl-4-tertiary-butyl benzene, 1-methyl-4-tert.-amyl benzene, methyl-dodecyl benzene, tert.-heptylmethylbenzene, the tertiary dodecyxylenes, tertiary-hexylethylbenzenes, 1 and 2-methyl naphthalenes, $\alpha,\beta$-dimethyl naphthalene, and their homologues.

In the presence of suitable oxidation catalysts these alkyl substituted aromatic hydrocarbons are converted to aromatic acids corresponding to the aromatic hydrocarbons having a carboxyl group in the alkyl side chain. Such aromatic acids are exemplified by, benzoic acid; the alkyl substituted benzoic acids such as tertiary butyl benzoic acid, amylbenzoic acid, tert.-amyl benzoic acid, cumic acid, dodecyl benzoic acid, para-tertiary-nonyl-benzoic acid, para-tert.-dodecylbenzoic acids, methyl-dodecylbenzoic acids, para-tert.-hexylbenzoic acids, $\alpha$ and $\beta$-naphthoic acids, and $\alpha,\beta$-dinaphthoic acids, and the like.

Catalysts employed in the oxidation of the alkyl aromatic acids comprise, for example, oxides, hydroxides and organic salts of the so-called heavy metals particularly such metals as cobalt, manganese, lead, iron, nickel, copper, vanadium chromium, mercury, and combinations thereof. Such catalysts comprise organic salts of the so-called heavy metals, organic salts of the metals of the first transition series of the elements, that is, those having an atomic number of from 22 to 30, and mixtures thereof. Examples of such salts of a metal and an organic acid include, cobalt naphthenate, cobalt isovaleryl acetonate, chromium acetylacetonate, cobalt butenylacetonate, cobalt para-toluate, chromium naphthenate, nickel naphthenate, nickel acetylacetonate, lead acetate, manganese naphthenate, and the like. The specific oxidation catalyst employed will often vary in accordance with specific material to be oxidized and the operating conditions employed.

Reaction mixtures obtained from such aromatic hydrocarbon oxidation processes will generally comprise, in addition to the desired aromatic acid, substantial amounts of unconverted aromatic hydrocarbons as well as varying amounts of oxygenated hydrocarbon by-products comprising, for example, aliphatic acids including formic acid, acetic acid, and the like, as well as lower boiling aldehydes and ketones. Since the oxidation catalysts are generally employed in a finely divided state distributed throughout the reactants, or as a solution in the reaction mixture, the reactor effluent will contain appreciable quantities of entrained catalyst and/or derivative products thereof.

The presence of these catalysts during crystallization of the desired aromatic acid results in a product containing occluded residual catalyst, or derivative products thereof, in contaminant amounts. Removal of the highly active contaminant from the crystallized product has heretofore been found to present a serious problem. Purification of the crystallized products by methods employed heretofore has generally been found to be unsatisfactory.

In accordance with the invention, the reaction mixture leaving the reactor comprising aromatic acid, unconverted hydrocarbons, other oxygenated hydrocarbons in lesser amount, and entrained catalyst, is subjected to liquid-liquid extraction with water in a suitable extraction zone at a temperature which is sufficiently high to assure the presence of at least the greater amount of the mixture undergoing extraction in the liquid phase.

Liquid-liquid extraction of the reaction mixture with water at an elevated temperature is preferably preceded by a filtration of the mixture to be extracted. The filtration is effected at a sufficiently high temperature to assure the presence of the desired monocarboxylic acid in the liquid state. Filtration may be carried out at the same temperature as that employed in the extraction zone. Filtration at the elevated temperature will serve to filter out undesired impurities which are solid at temperatures at which the desired monocarboxylic acids are in the liquid state. Such impurities will comprise, for example, dicarboxylic acids. It is to be stressed that such filtration will not reduce the entrained catalyst content below a contaminating amount.

The specific temperature employed in the extraction of the aromatic acid-containing mixture may vary considerably within the scope of the invention. In general it is preferred to employ a temperature not substantially in excess of that assuring the presence of at least the greater part of the mixture in the liquid state and not exceeding that at which vaporization to any substantial degree of any components will take place. Specific temperatures particularly preferred within the permissible limits will vary in accordance with the specific composition extracted. Thus, for reaction mixtures containing benzoic acid obtained by the oxidation of toluene in the presence of cobalt naphthenate temperatures in the range of from about 50° C. to about 85° C. are preferred. For reaction mixtures containing tertiarybutyl benzoic acid obtained by the oxidation of tert.-butyl toluene in the presence of cobalt naphthenate temperatures in the range of from about 65° C. to about 125° C. are preferred. Higher or lower temperatures may, however, be employed within the scope of the invention.

Atmospheric or superatmospheric pressures may be employed during the extraction and also during the preceding filtration. The use of elevated pressures may be resorted to to aid in maintaining desired temperature conditions during the extraction.

Under the above-defined conditions impurities comprising, for example, metal compounds, such as organic metal salts, or derivative products thereof, are removed from the mixture being extracted by the water with the formation of a raffinate phase comprising unconverted hydrocarbons and aromatic acid which is substantially free of metal salts, or derivative products thereof, and an aqueous extract phase comprising water and metal compounds such as metal salts or derivative products thereof. The raffinate and extract phases are withdrawn separately from the extraction zone.

The ability to thus effect the substantially complete removal of residual amounts of metal compounds such as organic metal salt-type catalysts and derivative components thereof, from the desired aromatic acid by the relatively simple expedient of extraction with water in the liquid phase at an elevated temperature is indeed entirely unexpected. Organic salts of metals such as, for example, cobalt naphthenate, are insoluble in water, the medium employed in the extraction, and possess appreciable solubility in hydrocarbons which are generally present in substantial amount and which pass into the raffinate phase.

The quantity of water employed during the extraction may vary considerably within the scope of the invention. In general, amounts of water ranging from about 5 to about 25 parts by weight based upon the total mixture extracted, have been found satisfactory. Greater or lesser quantities of water may, however, be employed within the scope of the invention.

Essential to the attainment of the purification is a hydrogen ion concentration of the mixture to be extracted below about 4, and preferably in the range of from about 2 to about 3, in terms of pH values. Increased efficiency in separation is generally obtained with decrease in pH of the mixture being extracted. Thus, the distribution coefficient of cobalt between an aqueous and a hydrocarbon phase was found to be about 80 at a pH of 3.6 and about 230 at a pH of 2.1 under otherwise substantially identical conditions. In the oxidation of aromatic hydrocarbons to the desired aromatic acids, sufficient low boiling aliphatic carboxylic acids, such as, for example, formic acid, acetic acid, and the like are generally formed to result in a reaction mixture in the desired pH range. However, materials, comprising, for example, lower boiling aliphatic acids such as formic acid, acetic acid, etc., may be added to the mixture prior to the hot water extraction in a sufficient amount to bring the hydrogen ion concentration thereof to a more preferred value within the permissible range. In general, the reactor effluent from a hydrocarbon oxidation operation will generally comprise sufficient unconverted hydrocarbons to maintain the aromatic acids in solution therein under conditions assuring a homogenous mixture. Additional hydrocarbons may, however, be added to, or extracted from, the reaction mixture prior to the extraction within the scope of the invention.

The liquid extraction of the oxidation reactor effluence with water in accordance with the invention may be carried out in any suitable type of apparatus assuring efficient contact of the extraction medium and the mixture undergoing extraction. Such suitable apparatus comprises, for example, extraction columns provided with suitable means, such as, inert packing, perforated plates, bubble plates, grid trays, baffles, or the like. The mixture to be extracted is passed through the column countercurrently to the water in a conventional manner of operation. Conventional means are provided for the control of the temperature within the column and of the aromatic acid-containing mixture and water streams prior to their introduction into the column. The aromatic acid- and unconverted hydrocarbon-containing raffinate phase withdrawn from the column is passed to suitable means for the separation of the aromatic acid therefrom. Such separation means may comprise, for example, one or more such steps as stratification, decantation, distillation, crystallization, washing, centrifuging and the like. As will be apparent to one skilled in the art, the extraction need not necessarily be executed in continuous operation in apparatus of the column type. Thus, the reactor effluence after filtration may, for example, be passed directly into a zone of enlarged cross-sectional area, such as, for example, a chamber, wherein the extraction is executed by introducing water and agitating the resulting mixture with suitable conventional means at a temperature assuring the presence of the aromatic acid in the liquid phase. Subsequent to the agitation, an aqueous phase is separated, for example, by stratification and decantation, in the same chamber. The residual solution of aromatic acid in unconverted hydrocarbon may thereupon be cooled to effect the crystallization of the desired aromatic acid in the same or a separate chamber.

Although the invention is applied with particular advantage to the extraction of reaction mixtures emanating directly from a hydrocarbon oxidizing zone and comprising the aromatic acid in solution in unconverted hydrocarbons, aromatic acids obtained from other sources may be freed of residual catalyst-containing impurities in accordance with the present invention. Thus, aromatic acids, such as benzoic acid, alkyl-substituted benzoic acids as tert.-butyl benzoic acid, and the like, containing residual catalyst components such as organic metal salts such as cobalt naphthenate or derivative products thereof, obtained from any suitable source are purified in accordance with the invention by mixing the impure aromatic acid with a hydrocarbon and extracting the resulting mixture with water in the liquid phase under the above-defined conditions. Suitable hydrocarbons comprise, aromatic hydrocarbons such as, benzene, alkyl-substituted benzenes, normally liquid aliphatic hydrocarbons, such as heptane, octane, nonane, decane, etc. Prior to the extraction, the pH of the aromatic acid-hydrocarbon mixture is adjusted by the addition thereto of suitable acids, such as, for example, lower aliphatic carboxylic acids. The process of the invention thus enables the substantially complete removal of contaminant amounts of residual impurities such as organic metal salts or derivative products thereof, not only from aromatic acid-containing hydrocarbon oxidation reaction mixtures, but also from aromatic acids whatever their source.

The efficiency with which monocarboxylic aromatic acids are freed of residual catalyst impurities comprising organic metal compounds is evidenced by the following:

*Example*

In a plurality of separate and independent operations alkyl benzenes were oxidized in the liquid phase in the presence of a catalyst consisting essentially of cobalt naphthenate. In each operation the liquid reactor effluent was filtered while still hot to effect the removal therefrom of undesired materials comprising dicarboxylic acids. The hot filtrate obtained in each case consisted predominantly of aromatic monocarboxylic acids dissolved in unconverted alkyl benzene and contained lesser amounts of lower aliphatic carboxylic acids such as formic acid, acetic acid, and other oxygen-containing organic by-products such as aldehydes, ketones and esters. In addition to these materials, the hot reaction mixture, after filtration, contained contaminating amounts of catalysts and derivative catalyst components. The aromatic acid content ranged from about 40% to about 65% by weight of the filtered reaction mixture. The filtered reaction mixture, while still hot, was extracted with an amount of water equal to about 10% by weight of the total reaction mixture, thereby forming a raffinate phase containing substantially all of the hydrocarbons and aromatic acids charged to the extraction and an extract phase containing water and substantially all of the catalyst and residual catalyst components. Hydrocarbons were separated from the aromatic acid in the raffinate phase by crystallization and centrifuging. Residual catalyst content of the aromatic carboxylic acid product was found by determining the cobalt content thereof. In the following table the alkyl benzene oxidized in each of the operations, the aromatic acid thereby obtained, and the pH of the filtered reaction mixture is set forth. Also indicated in the table are the temperature of the extraction, as well as the cobalt content of the filtered reaction mixture before extraction and of the final aromatic acid product, for each of these operations.

| Alkyl Benzene Oxidized | Aromatic Acid | pH of Reaction Filtered Mixture | Temp. of Extraction, °C. | Cobalt Content in Parts per Million of— | |
|---|---|---|---|---|---|
| | | | | Reaction Mixture Before Extraction | Alkyl Benzoic Acid Product After Extraction |
| Tert.-butyl toluene. | Tert.-butyl Benzoic Acid. | | 70 | 29 | 1 |
| Do | do | 3.6 | 70 | 32 | 3.9 |
| Do | do | 2.1 | 70 | 32.2 | 1.1 |
| Do | do | | 90 | 25 | |
| Toluene | Benzoic Acid. | <4 | 70 | 55 | <1 |

The invention claimed is:

1. The process for separating a tert.-alkyl-substituted benzene monocarboxylic acid in a high state of purity from the oxidation reaction mixture obtained by the catalytic oxidation of the corresponding tert.-alkyl-substituted toluene in the presence of an organic salt of a polyvalent metal, said mixture containing said tert.-alkyl-substituted benezene monocarboxylic acid in admixture with unconverted tert.-alkyl-substituted toluene and entrained organic salt of a polyvalent metal, which comprises extracting said oxidation reaction mixture in the liquid state with a solvent consisting of water at a temperature in the range of from about 50 to about 125° C. at which at least the greater part of said oxidation reaction mixture is in the liquid state and while said oxidation reaction mixture is at a hydrogen ion concentration in the range of from about 2 to about 4 in terms of pH values as a result of the presence therein of acidic organic oxidation products formed during the production of said oxidation reaction mixture during said catalytic oxidation, thereby forming a raffinate phase comprising tert.-alkyl-substituted toluene and tert.-alkyl-substituted benzene monocarboxylic acid which is substantially free from said organic salt of a polyvalent metal, and separating said tert.-alkyl-substituted benzene monocarboxylic acid in a high state of purity substantially free of organic salt of polyvalent metal from said raffinate phase.

2. The process in accordance with claim 1 wherein said tert.-alkyl-substituted benzene monocarboxylic acid-containing mixture is subjected to filtration at a temperature in the range of from about 50 to about 125° C. at which at least the greater part of said mixture is in the liquid state prior to said extraction.

3. The process in accordance with claim 1 wherein said tert.-alkyl-substituted benzene monocarboxylic acid is separated from said raffinate by crystallization.

4. The process for separating tert.-butyl benzoic acid in a high state of purity from an oxidation reaction mixture obtained by the catalytic oxidation of hydrocarbons comprising tert.-butyl toluene in the presence of an organic salt of a polyvalent metal, said mixture containing said tert.-butyl benzoic acid in admixture with hydrocarbons comprising tert.-butyl toluene and entrained organic salt of a polyvalent metal, which comprises extracting said reaction mixture in the liquid state with a solvent consisting of water at a temperature in the range of from about 65° C. to about 125° C. and while said oxidation reaction mixture has a hydrogen ion concentration in the range of from about 2 to about 4 in terms of pH values as a result of the presence therein of acidic organic oxidation products formed during the production of said oxidation reaction mixture during said oxidation, thereby forming a raffinate phase comprising tert.-butyl toluene and tert.-butyl benzoic acid which is substantially free from organic salt of polyvalent metal and an extract phase comprising water and said organic salt of a polyvalent metal, and separating tert.-butyl benzoic acid in a high state of purity substantially free of organic salt of a polyvalent metal from said raffinate phase.

5. The process in accordance with claim 4 wherein said oxidation reaction mixture containing said tert.-butyl benzoic acid in admixture with hydrocarbons comprising tert.-butyl toluene and entrained organic metal salt is subjected to filtration at a temperature in the range of from about 65 to about 125° C. at which the greater part of said mixture is in the liquid state prior to said extraction.

6. The process in accordance with claim 4 wherein said organic salt of a polyvalent metal is cobalt naphthenate.

References Cited in the file of this patent
UNITED STATES PATENTS
1,685,634    Jaeger   _____ Sept. 24, 1928

(Other references on following page)

UNITED STATES PATENTS

| | | |
|---|---|---|
| 1,686,913 | Jaeger | Oct. 9, 1928 |
| 2,302,462 | Palmer et al. | Nov. 17, 1942 |
| 2,490,444 | Kooijman et al. | Dec. 6, 1949 |
| 2,556,213 | Pierotti et al. | June 12, 1951 |
| 2,556,228 | Souders | June 12, 1951 |
| 2,572,575 | Shafer et al. | Oct. 23, 1951 |

FOREIGN PATENTS

| | | |
|---|---|---|
| 623,836 | Great Britain | May 24, 1949 |

OTHER REFERENCES

MacArdle: "Use of Solvents in Synthetic Org. Chem." (Van Nostrand), pages 1–3 (1925).

Noller, Carl R.: "Chemistry of Organic Compounds," W. B. Saunders Co., Philadelphia and London; 1st printing Apr. 20, 1951 (page 16, lines 14 to 16 inclusive).